(12) United States Patent
Kaushik et al.

(10) Patent No.: US 11,704,207 B2
(45) Date of Patent: *Jul. 18, 2023

(54) METHODS AND SYSTEMS FOR A NON-DISRUPTIVE PLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM WITHOUT USING AN EXTERNAL MEDIATOR

(71) Applicant: NetApp, Inc., San Jose, CA (US)

(72) Inventors: Akhil Kaushik, Karnataka (IN); Anoop Vijayan, Karnataka (IN)

(73) Assignee: NetApp. Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/881,381

(22) Filed: Aug. 4, 2022

(65) Prior Publication Data

US 2022/0374321 A1 Nov. 24, 2022

Related U.S. Application Data

(63) Continuation of application No. 17/238,829, filed on Apr. 23, 2021, now Pat. No. 11,409,622.

(51) Int. Cl.
*G06F 11/20* (2006.01)
*G06F 11/30* (2006.01)
*G06F 11/14* (2006.01)

(52) U.S. Cl.
CPC ...... *G06F 11/2069* (2013.01); *G06F 11/1466* (2013.01); *G06F 11/1469* (2013.01); *G06F 11/3034* (2013.01)

(58) Field of Classification Search
CPC ............ G06F 11/2069; G06F 11/1469; G06F 11/1466; G06F 11/3034; G06F 11/30; G06F 11/20; G06F 11/11
See application file for complete search history.

(56) References Cited

U.S. PATENT DOCUMENTS

| 5,742,792 A | 4/1998 | Yanai et al. |
| 6,389,551 B1* | 5/2002 | Yount ................. G06F 11/2025 |
| | | 714/4.11 |

(Continued)

OTHER PUBLICATIONS

Notice of Allowance dated Nov. 18, 2022 for U.S. Appl. No. 17/219,812, filed Mar. 31, 2021, 12 pages.

(Continued)

*Primary Examiner* — Kamini B Patel
(74) *Attorney, Agent, or Firm* — Jaffery Watson Mendonsa & Hamilton LLP

(57) ABSTRACT

Systems and methods are described for a non-disruptive planned failover from a primary copy of data at a primary storage cluster to a mirror copy of the data at a cross-site secondary storage cluster without using an external mediator. According to an example, a planned failover feature of a multi-site distributed storage system provides an order of operations such that a primary copy of a first data center continues to serve I/O operations until a mirror copy of a second data center is ready. This planned failover feature improves functionality and efficiency of the distributed storage system by providing non-disruptiveness during planned failover without using an external mediator based on a primary storage cluster being selected as an authority to implement a state machine with a persistent configuration database to track a planned failover state for the planned failover.

20 Claims, 9 Drawing Sheets

(56) References Cited

U.S. PATENT DOCUMENTS

| | | | |
|---|---|---|---|
| 6,415,372 | B1 | 7/2002 | Zakai et al. |
| 7,039,827 | B2 | 5/2006 | Meyer et al. |
| 7,500,014 | B1* | 3/2009 | Jacobson ............ H04L 41/0896 709/239 |
| 7,631,066 | B1* | 12/2009 | Schatz ................ G06F 9/5022 709/224 |
| 7,640,451 | B2 | 12/2009 | Meyer et al. |
| 7,644,305 | B2 | 1/2010 | Friedrich et al. |
| 7,890,626 | B1 | 2/2011 | Gadir |
| 8,498,967 | B1 | 7/2013 | Chatterjee et al. |
| 8,645,623 | B1 | 2/2014 | O'Shea et al. |
| 8,856,583 | B1 | 10/2014 | Visser et al. |
| 8,874,960 | B1 | 10/2014 | Khan et al. |
| 9,189,341 | B1* | 11/2015 | Natanzon ............ G06F 11/1451 |
| 10,412,066 | B1 | 9/2019 | Vemuri |
| 10,496,320 | B2* | 12/2019 | Eisler ................ G06F 11/2058 |
| 10,725,691 | B1* | 7/2020 | Kaushik ................ G06F 3/0604 |
| 10,761,768 | B1* | 9/2020 | Kaushik ................ G06F 3/0683 |
| 11,036,423 | B2 | 6/2021 | Kaushik et al. |
| 11,089,105 | B1 | 8/2021 | Karumbunathan et al. |
| 11,327,857 | B2 | 5/2022 | Bhargava et al. |
| 11,360,867 | B1 | 6/2022 | Subramanian et al. |
| 11,409,622 | B1 | 8/2022 | Kaushik et al. |
| 11,481,139 | B1 | 10/2022 | Vijayan et al. |
| 11,550,679 | B2 | 1/2023 | Kaushik et al. |
| 2002/0132613 | A1* | 9/2002 | Leung .................. H04L 51/066 455/414.1 |
| 2004/0153719 | A1 | 8/2004 | Achiwa et al. |
| 2005/0229034 | A1 | 10/2005 | Fujibayashi |
| 2006/0236048 | A1 | 10/2006 | Deguchi et al. |
| 2007/0180307 | A1* | 8/2007 | Zohar .................. G06F 3/0607 714/E11.136 |
| 2007/0234006 | A1 | 10/2007 | Radulescu et al. |
| 2008/0201702 | A1 | 8/2008 | Bunn |
| 2009/0043979 | A1* | 2/2009 | Jarvis ................ G06F 11/2074 711/E12.103 |
| 2009/0089609 | A1 | 4/2009 | Baba |
| 2009/0307530 | A1 | 12/2009 | Tarta |
| 2010/0064168 | A1 | 3/2010 | Smoot et al. |
| 2010/0082962 | A1 | 4/2010 | Srinivasan et al. |
| 2010/0161554 | A1 | 6/2010 | Datuashvili et al. |
| 2011/0106855 | A1* | 5/2011 | Resch .................. H04L 12/00 707/793 |
| 2011/0314148 | A1* | 12/2011 | Petersen ............ H04L 63/1408 709/224 |
| 2012/0151249 | A1 | 6/2012 | Swan et al. |
| 2014/0298136 | A1* | 10/2014 | Resch ................ G06F 11/1076 714/763 |
| 2015/0006949 | A1* | 1/2015 | Bitties ................ G06F 11/2028 714/4.11 |
| 2015/0058838 | A1* | 2/2015 | Tsirkin ................ G06F 9/4862 718/1 |
| 2015/0378767 | A1 | 12/2015 | Tarasuk-Levin et al. |
| 2016/0063083 | A1 | 3/2016 | Mu et al. |
| 2016/0366226 | A1 | 12/2016 | Friedman et al. |
| 2017/0093983 | A1 | 3/2017 | Everhart et al. |
| 2017/0185306 | A1* | 6/2017 | Eisler ...................... G06F 3/065 |
| 2018/0260125 | A1* | 9/2018 | Botes ...................... G06F 3/065 |
| 2018/0352032 | A1 | 12/2018 | Liu et al. |
| 2019/0004908 | A1 | 1/2019 | Gopinath et al. |
| 2019/0034286 | A1 | 1/2019 | Brown et al. |
| 2019/0229978 | A1 | 7/2019 | Rajvaidya et al. |
| 2019/0347352 | A1 | 11/2019 | Gochkov et al. |
| 2019/0394266 | A1 | 12/2019 | Fukuyama et al. |
| 2020/0034258 | A1* | 1/2020 | Avraham ............ G06F 11/2094 |
| 2020/0050495 | A1 | 2/2020 | Voutilainen et al. |
| 2020/0050587 | A1 | 2/2020 | Kaushik et al. |
| 2020/0125460 | A1 | 4/2020 | Selvaraj et al. |
| 2020/0133520 | A1* | 4/2020 | Patnaik ................ G06F 11/2076 |
| 2020/0273984 | A1 | 8/2020 | Nakano et al. |
| 2020/0278984 | A1* | 9/2020 | Kaushik ............ G06F 11/2069 |
| 2020/0310653 | A1* | 10/2020 | Kaushik .................. G06F 3/065 |
| 2020/0319982 | A1 | 10/2020 | Rusev et al. |
| 2020/0356274 | A1* | 11/2020 | Kaushik .................. G06F 3/065 |
| 2021/0303165 | A1* | 9/2021 | Kaushik ................ G06F 3/0604 |
| 2021/0374157 | A1 | 12/2021 | Reddy et al. |
| 2022/0019350 | A1 | 1/2022 | Karr |
| 2022/0121533 | A1 | 4/2022 | Kumar et al. |
| 2022/0317896 | A1 | 10/2022 | Valan et al. |
| 2022/0317897 | A1 | 10/2022 | Subramanian et al. |
| 2022/0318104 | A1 | 10/2022 | Bhargava et al. |
| 2022/0318105 | A1 | 10/2022 | Subramanian et al. |

OTHER PUBLICATIONS

Notice of Allowance dated Oct. 31, 2022 for U.S. Appl. No. 17/219,812, filed Mar. 31, 2021, 9 pages.

Pan L., "Paxos at its heart is very simple," Distributed System, 2018, Retrieved From : URL: https://blog.the-pans.com/paxos-explained/, pp. 1-12.

U.S. Notice of Allowance dated Oct. 26, 2022 in U.S. Appl. No. 17/219,812, 9 pages.

U.S. Non-Final Office action dated Dec. 21, 2021 in U.S. Appl. No. 17/238,829.

U.S. Notice of Allowance dated Apr. 6, 2022 in U.S. Appl. No. 17/238,829.

U.S. Notice of Allowance dated Jun. 23, 2022 in U.S. Appl. No. 17/219,746.

U.S. Notice of Allowance dated Jun. 24, 2022 in U.S. Appl. No. 17/219,816.

Co-pending U.S. Appl. No. 17/861,768, inventor Narasingarayanapeta; Krishna Murthy Chandraiah Setty, filed Jul. 11, 2022.

Notice of Allowance dated Mar. 20, 2023 for U.S. Appl. No. 17/219,740, filed Mar. 31, 2021, 11 pages.

Notice of Allowance dated Mar. 3, 2023 for U.S. Appl. No. 17/219,815, filed Mar. 31, 2021, 5 pages.

Non-Final Office Action dated Mar. 16, 2023 for U.S. Appl. No. 17/970,961, filed Oct. 21, 2022, 6 pages.

Notice of Allowance dated Dec. 13, 2022 for U.S. Appl. No. 17/219,815, filed Mar. 31, 2021.

Notice of Allowance dated Apr. 7, 2023 for U.S. Appl. No. 17/219,740, filed Mar. 31, 2021, 7 pages.

Non-Final Office Action dated Apr. 13, 2023 for U.S. Appl. No. 18/066,775, filed Dec. 15, 2022, 16 pages.

* cited by examiner

METHODS AND SYSTEMS FOR A NON-DISRUPTIVE PLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM WITHOUT USING AN EXTERNAL MEDIATOR

RELATED APPLICATIONS

This application is a continuation of U.S. patent application Ser. No. 17/238,829, filed Apr. 23, 2021, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2021, NetApp, Inc.

FIELD

Various embodiments of the present disclosure generally relate to multi-site distributed data storage systems. In particular, some embodiments relate to improving system operation and user experience based on providing a non-disruptive planned failover from a primary storage system to a secondary mirrored storage system without using an external mediator.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Systems and methods are described for a non-disruptive planned failover from a primary copy of data at a primary storage cluster to a mirror copy of the data at a cross-site secondary storage cluster without using an external mediator. According to an example, a planned failover feature of a multi-site distributed storage system provides an order of operations such that a primary copy of a first data center continues to serve I/O operations until a mirror copy of a second data center is ready. This planned failover feature improves functionality and efficiency of the distributed storage system by providing non-disruptiveness during planned failover without using an external mediator based on a primary storage cluster being selected as an authority to implement a state machine with a persistent configuration database to track a planned failover state for the planned failover.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
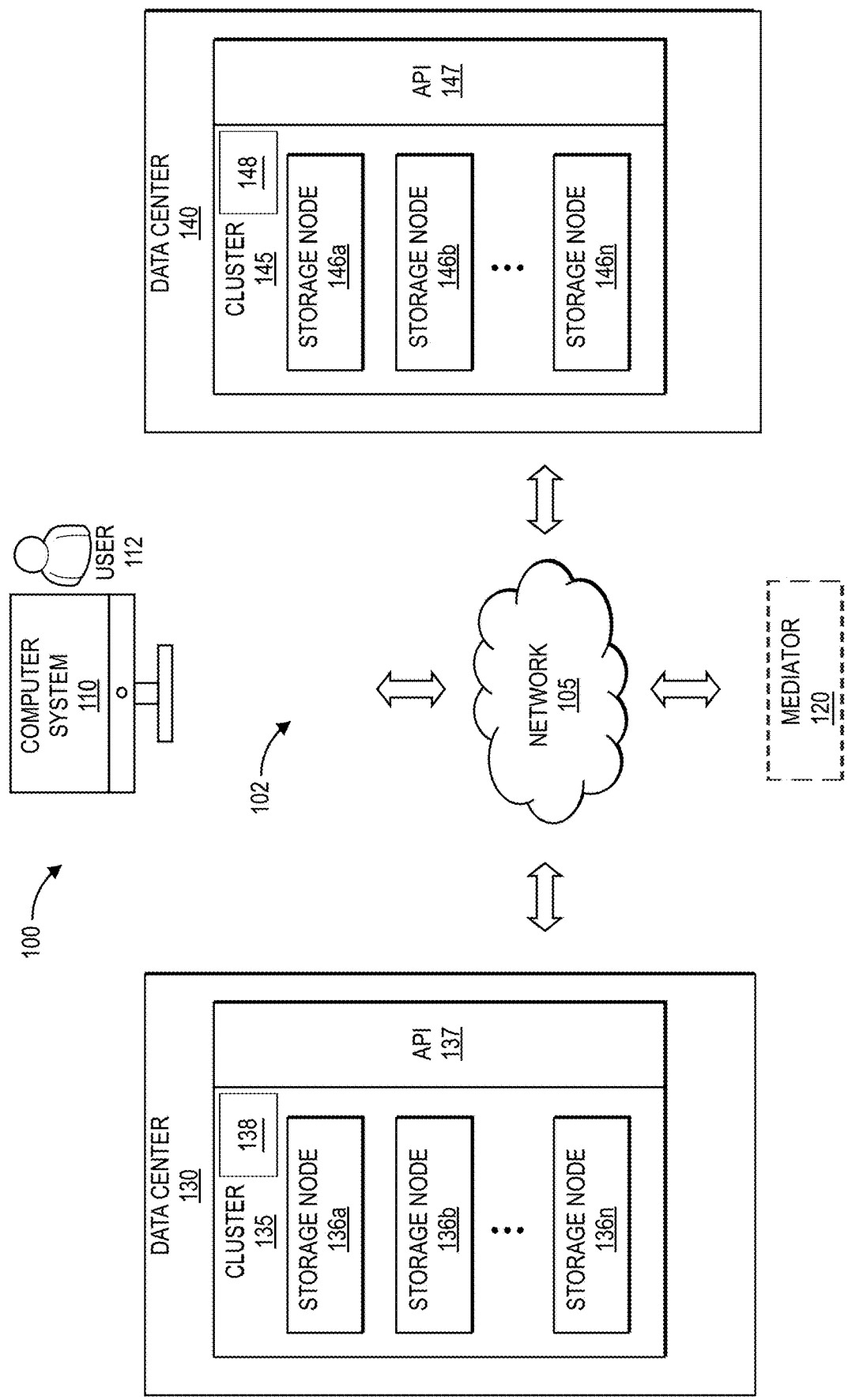
FIG. 1 is a block diagram illustrating an environment in which various embodiments may be implemented.

Multi-site distributed storage systems and computer-implemented methods are described for providing a planned failover feature to guarantee non-disruptive operations (e.g., operations of business enterprise applications, operations of software application) without using an external mediator even in the presence of failures including, but not limited to, network disconnection between multiple data centers and failures of a data center or cluster. An order of operations performed by a planned failover includes a timing window where both a primary copy of a first data center and a mirror copy of a second data center are designated with a role of a master and therefore are capable of serving input/output (I/O) operations (e.g., I/O commands) to an application independently. However, if multiple data centers are simultaneous allowed to serve I/O operations, then this cause a split-brain situation and results in data consistency issues.

This planned failover feature of a multi-site distributed storage system provides an order of operations such that a primary copy of a first data center continues to serve I/O operations until a mirror copy of a second data center is ready. A set of data containers or volumes are grouped together to form a consistency group (CG) and the primary copy is synchronously replicated as a mirror copy to the second data center. This planned failover feature improves functionality and efficiency of the multi-site distributed storage system by providing non-disruptiveness during planned failover without using an external mediator that is external from the multi-site distributed storage system. The planned failover feature also includes a persistent fence to avoid serving I/O operations during a timing window when both primary data storage and secondary data storage are attempting to have a master role to serve I/O operations and this avoids a split-brain situation.

Operations of business enterprises and software applications that utilize a multi-site distributed storage system are improved due to being able to continuously access that distributed storage system even in the presence of multiple failures within the distributed storage system or failures between components of the distributed storage system.

A current approach that has more disruption and down time due to one or more failures within a storage system or between storage systems will be less efficient in serving I/O operations due to the disruption of operations including serving I/O operations. The current approach will not be able to determine a consensus for serving I/O operations if a connection from a data center to a mediator is lost or disrupted. In this case, a primary storage and secondary mirror storage may both attempt to obtain consensus and both attempt to serve I/O operations simultaneously, which will reduce the distributed storage system efficiency and congest network connections to clients with redundant responses to I/O operations.

Other current approaches provide local high availability protection with non-disruptive operations in the event of a single controller failure though operations will be disrupted in the event of a double failure.

In one embodiment, cross-site high availability is a valuable addition to cross-site zero recover point objective (RPO) that provides non-disruptive operations even if an entire local data center becomes non-functional based on a seamless failing over of storage access to a mirror copy hosted in a remote data center. This type of failover is also known as zero RTO, near zero RTO, or automatic failover. A cross-site high availability storage when deployed with host clustering enables workloads to be in both data centers.

A planned failover of storage access from a primary copy of the dataset to a cross-site mirror copy is desired due to business process requirements to prove that the mirror copy actually works in case of a real disaster and also as a general practice to periodically switch the primary and mirror data centers.

A planned failover is desired for a distributed high availability storage system. The planned failover can also be used for non-disruptive migration of workloads in a planned fashion. Given that more workloads are moving to a cloud environment and many customers deploy hybrid cloud, applications will also demand these same features in the cloud including cross-site high availability, planned failover, planned migration, etc.

As such, embodiments described herein seek to improve the technological processes of multi-site distributed data storage systems. Various embodiments of the present technology provide for a wide range of technical effects, advantages, and/or improvements to multi-site distributed storage systems and components. For example, various embodiments may include one or more of the following technical effects, advantages, and/or improvements: (i) order of operations of a planned failover operation such that a primary copy of storage continues to serve I/O operations until a mirror copy is ready; (ii) guarantee non-disruptiveness during planned failover without using an external mediator—even in presence of various failures due to establishing a primary storage cluster as an authority with this authority being a single source of truth to provide consistency and correctness using an atomic test and set procedure; (iii) implement a state machine with the authority to track failover state and advance failover workflow to avoid disruption even when connectivity to a mediator is disrupted or no mediator exists; (iv) engaging filesystem persistent fence to reduce complexity of overall solution when dealing with controller reboots during planned failover and also to avoid split-brain.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the optional mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a storage cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the optional mediator 120.

Turning now to the cluster 135, it includes a configuration database 138, multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes a configuration database 148, multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, optional mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the optional mediator 120, which may represent a private or public cloud accessible (e.g., via a web portal) to an administrator associated with a managed service provider and/or administrators of one or more customers of the managed service provider, includes a cloud-based, monitoring system. The mediator 120 is external from the clusters 135 and 145 and located at a different location than the clusters 135 and 145.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
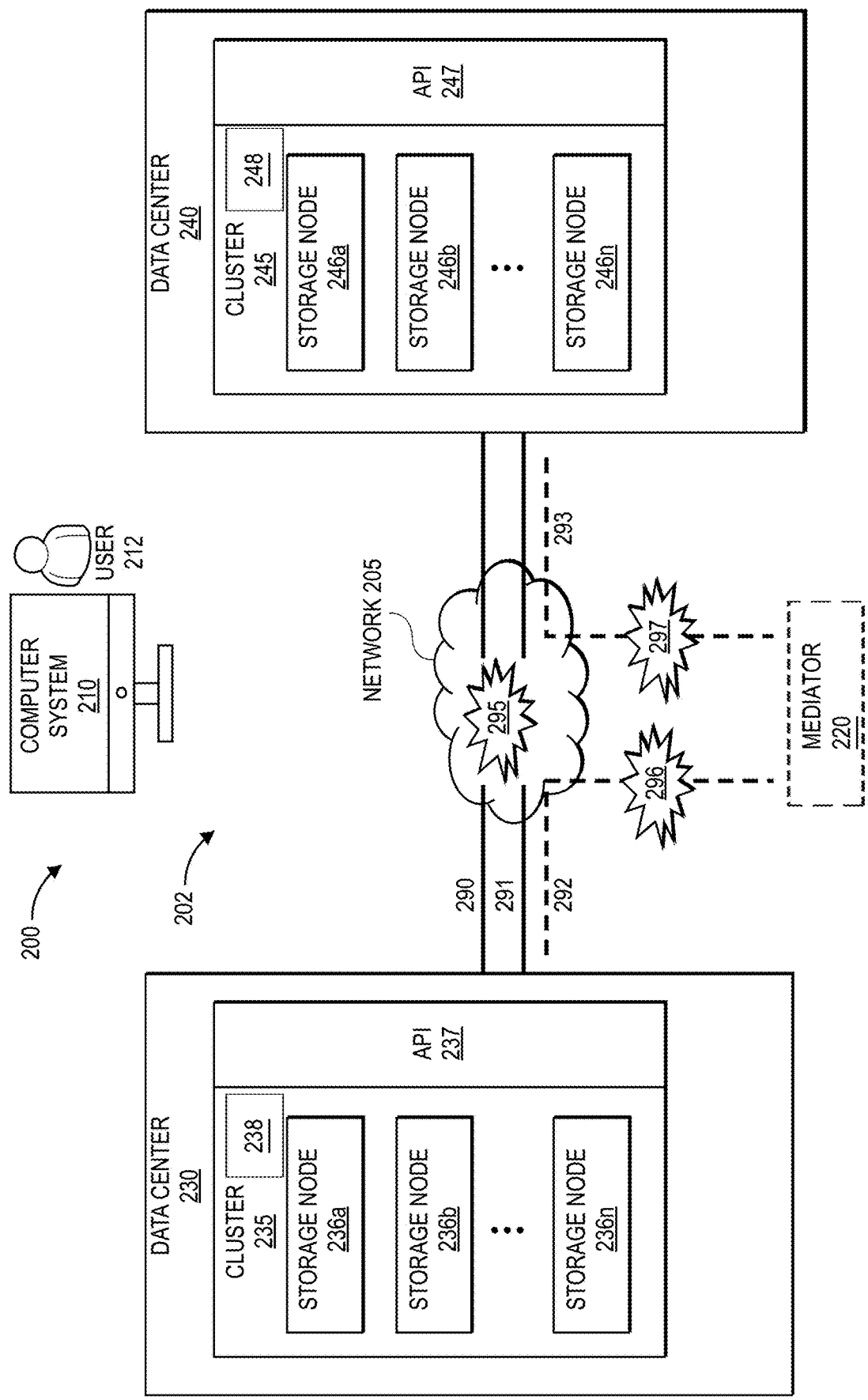
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally an external mediator 220. The data centers 230 and 240, the optional mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide a planned failover without using the mediator even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235 (or storage cluster 235), it includes a configuration database 238, at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245 (or storage cluster 245), it includes a configuration database 248, at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 consistency groups with each consistency group having up to 12 volumes. The system 202 provides a planned failover feature at a consistency group granularity. The planned failover feature allows switching storage access from a primary copy of the data center 230 to a mirror copy of the data center 240 or vice versa.

Figure 3:
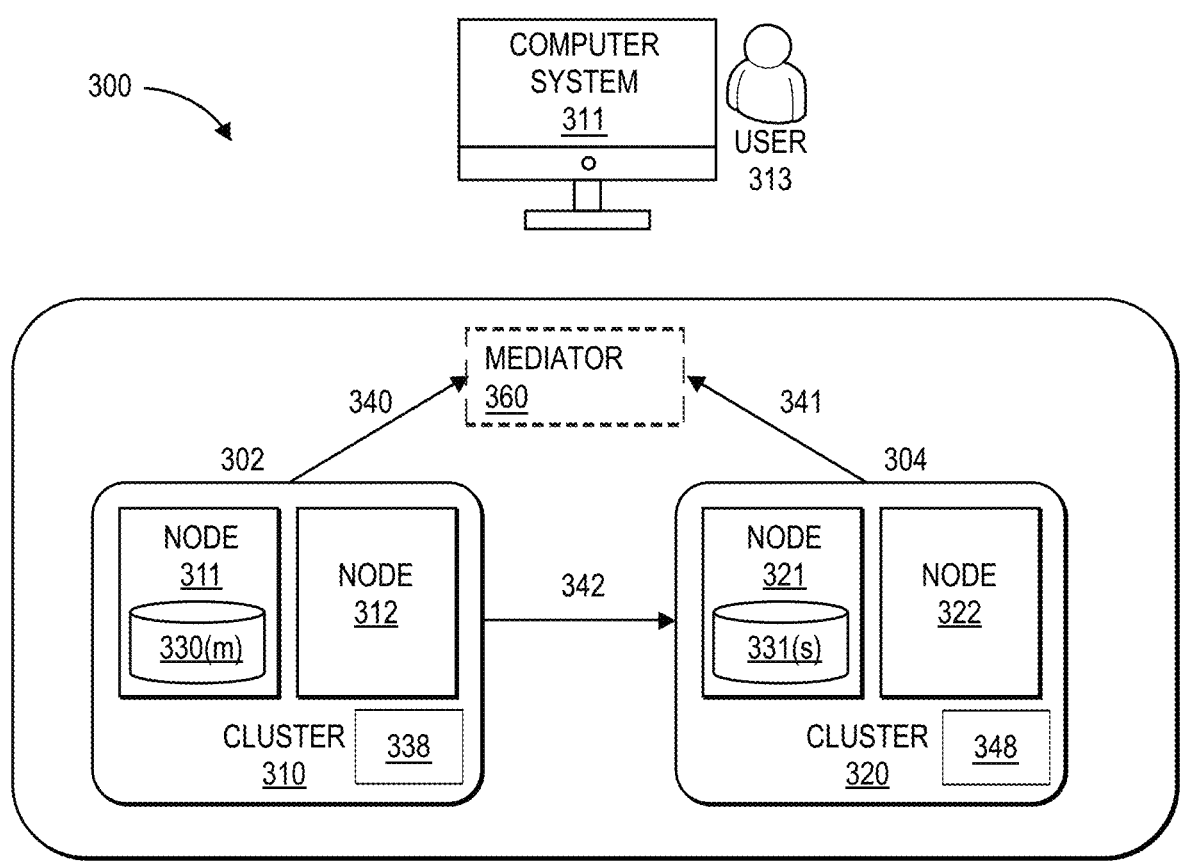
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 313) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 311. In the context of the present example, the distributed storage system 300 includes a data center 302 having a cluster 310, a data center 304 having a cluster 320, and an optional mediator 360. The clusters 310, 320, and the optional mediator 360 are coupled in communication (e.g., communications 340-342) via a network, which, depending upon the particular implementation, may be a Local Area Network (LAN), a Wide Area Network (WAN), or the Internet.

The cluster 310 includes a configuration database 338, nodes 311, and 312 while the cluster 320 includes a configuration database 348, nodes 321, and 322. In one example, the cluster 320 has a data copy 331 that is a mirrored copy of the data copy 330 to provide a planned failover without using the optional mediator 360 even in the presence of failures including, but not limited to, network disconnection between the data centers 302 and 304 and the mediator 360.

The master and slave roles for the clusters 310 and 320 (or storage clusters 310 and 320) help to avoid a split-brain situation with both of the clusters simultaneously attempting to serve I/O operations. There are scenarios where both master and slave copies can claim to be a master copy. For example, a recovery post failover or failure during planned failover workflow can results in both clusters 310 and 320 attempting to serve I/O operations. If a failover rollback timer is started for the master and a slave is required to perform a role change from being a slave to being a master, then the rollback timer and the role change need to be coordinated to avoid having the master and the slave both obtain consensus to cause a split-brain.

The multi-site distributed storage system 300 provides correctness of data, availability, and redundancy of data. In one example, the mediator 360 is not included in the storage system 300. One of the storage clusters 310 and 320 is selected as an authority and implements a state machine to track a failover state and advance a failover workflow without having a mediator. This authority will be local for one cluster and remote for the other cluster. The new authority being a single source of truth, can provide consistency and correctness using atomic test and set semantics.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
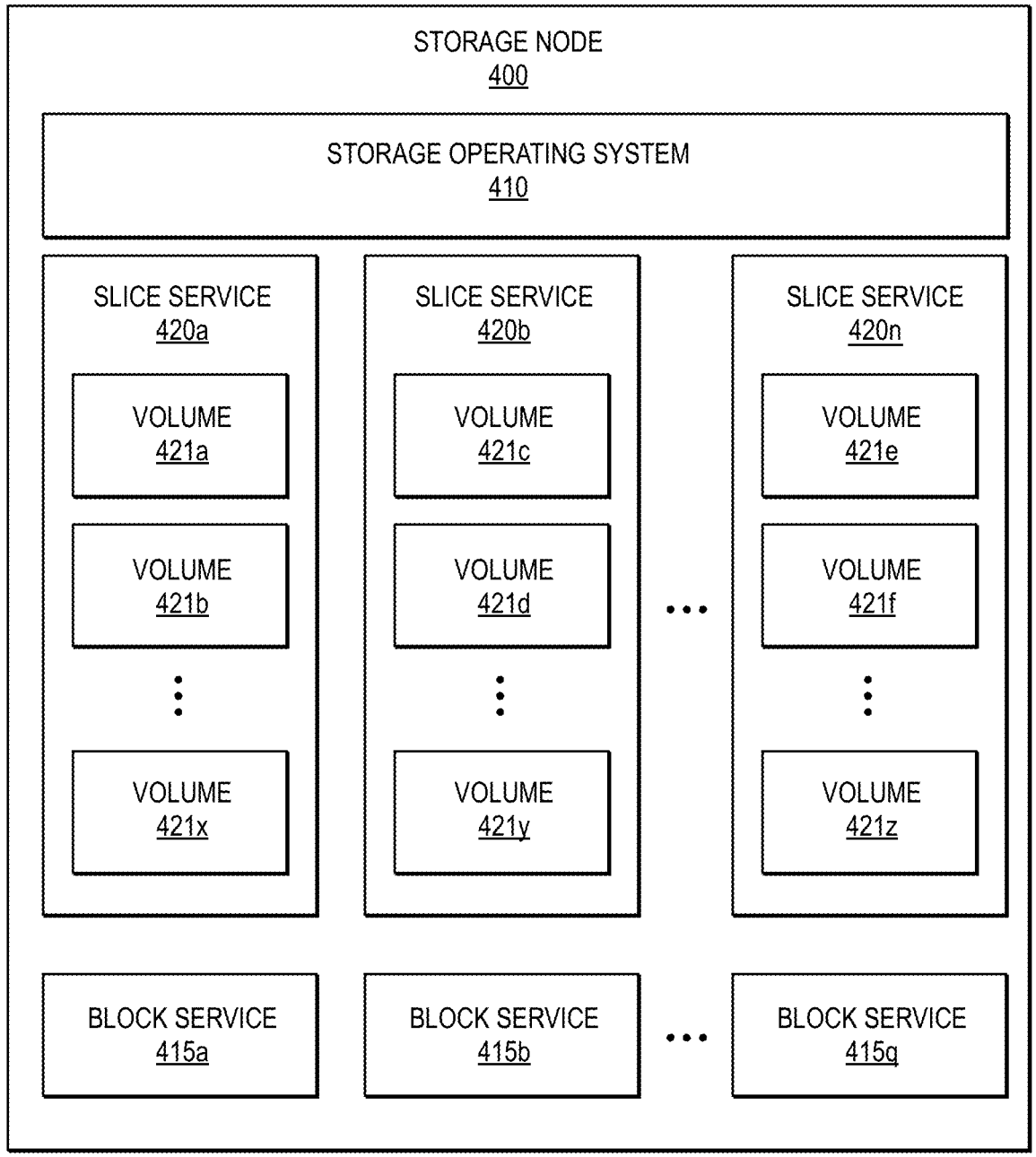
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, 322, 712, 714, 752, 754) described herein. In the context of the present example, a storage node 400 may be a network storage controller or controller that provides access to data stored on one or more volumes. The storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Figure 5:
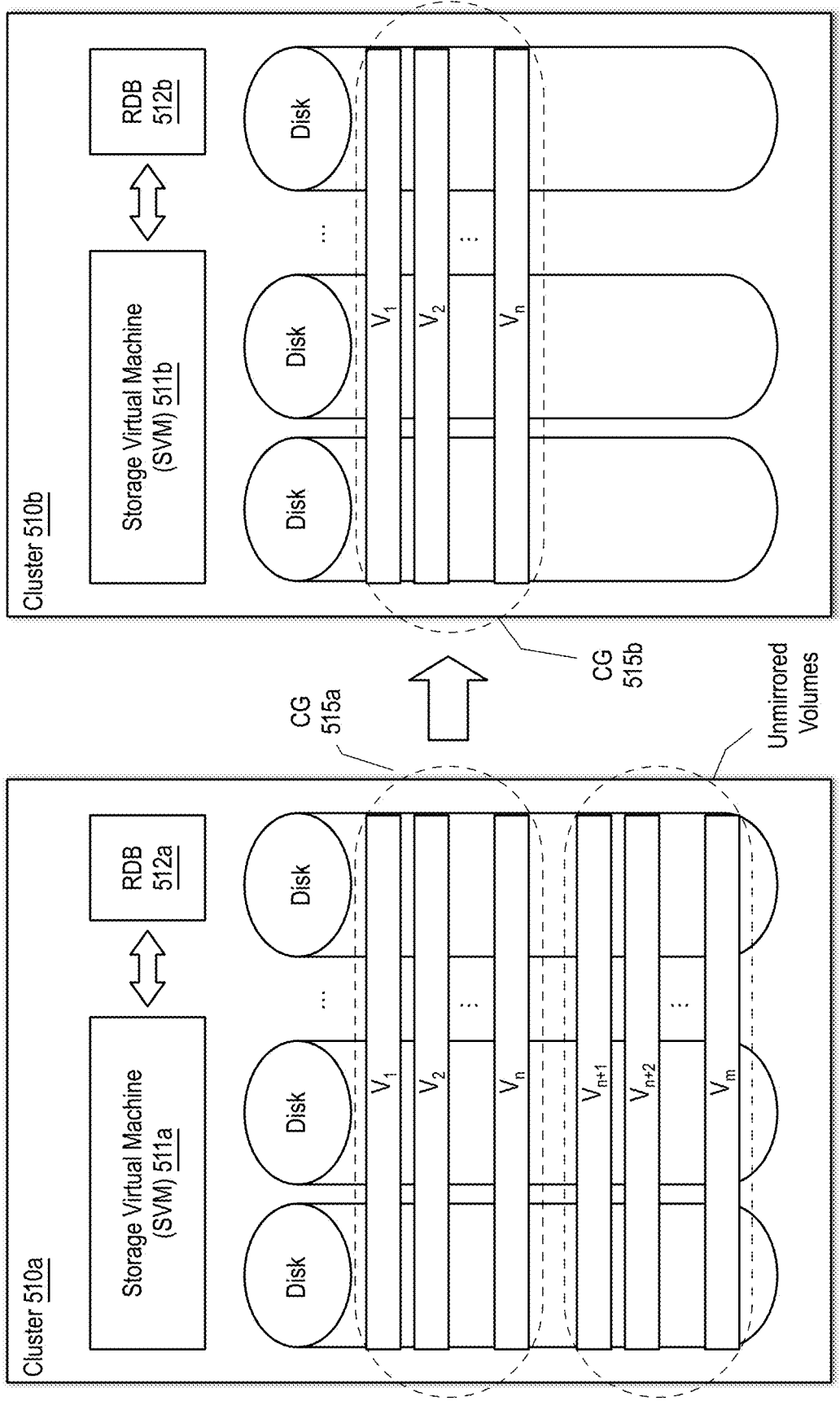
FIG. 5 is a block diagram illustrating the concept of a consistency group (CG) in accordance with an embodiment.

FIG. 5 is a block diagram illustrating the concept of a consistency group (CG) in accordance with an embodiment. In the context of the present example, a stretch cluster including two clusters (e.g., storage clusters 510a and 510b) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (master) cluster is stored on more than one secondary (slave) cluster.

Figure 6A:
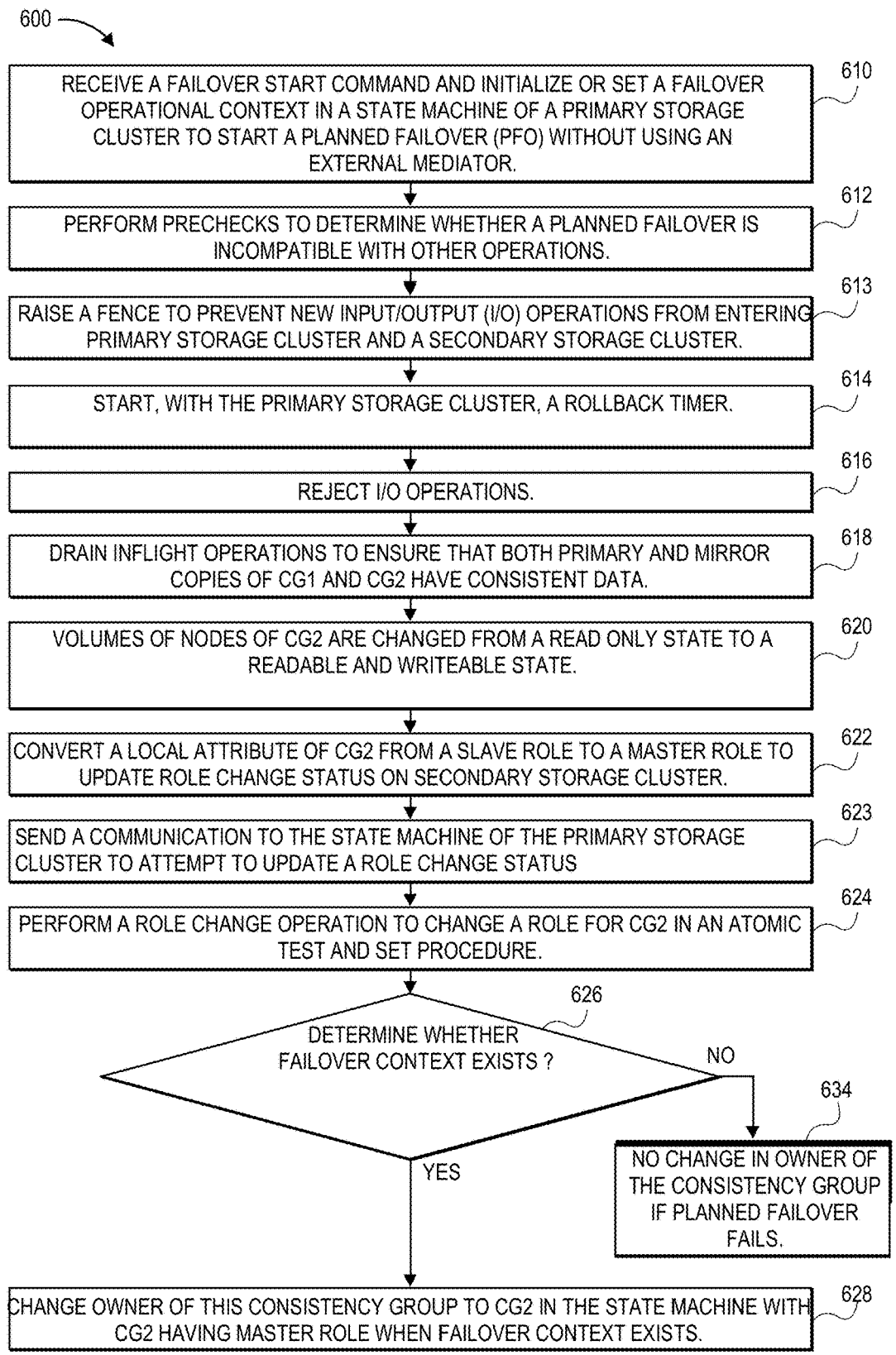
FIGS. 6A and 6B are flow diagrams illustrating a computer-implemented method 600 of operations for a planned failover feature that provides non-disruptiveness in presence of failures without using an external mediator in accordance with an embodiment of the present disclosure.
Figure 6B:
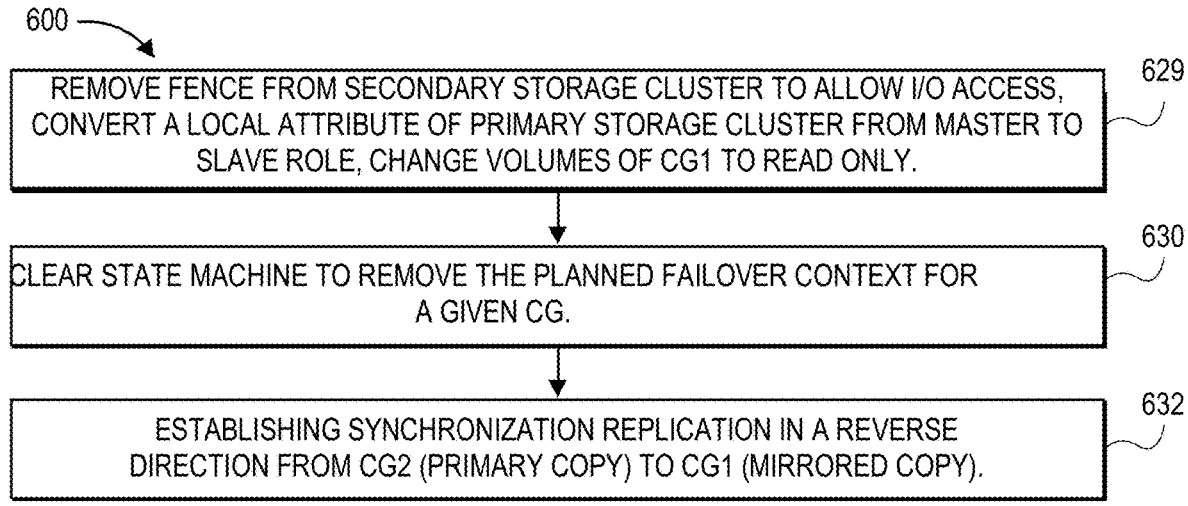

FIGS. 6A and 6B are flow diagrams illustrating a computer-implemented method 600 of operations for a planned failover feature that provides non-disruptiveness without using an external mediator in accordance with an embodiment of the present disclosure. As noted above, this planned failover feature of the present design provides an order of operations such that a primary copy of a first data center continues to serve I/O operations until a mirror copy of a second data center is ready. This planned failover feature provides non-disruptiveness during planned failover without using an external mediator—in presence of various failures including, but not limited to, network disconnection among different sites including a primary storage site, a secondary storage site, and an optional external mediator. Furthermore, the order of operations performed by a planned failover operation includes a window where both copies of the primary and secondary sites may be designated with role of master and therefore are capable of serving I/O operations independently. If primary and secondary sites are both designated with role of master, then this will lead to split-brain and result in data consistency issues. The present design eliminates a requirement of the external mediator/arbitrator that is external from the primary and secondary storage sites for a planned failover operation while maintaining the non-disruptiveness guarantee and also avoids split-brain.

A problem to be solved in case of planned failover is the race between a primary site have a master role and a secondary site having a slave role. The secondary site as part of a planned failover operation, performs a role change operation (e.g., point of no return operation) to request for consensus, while the primary site may also attempt to obtain consensus due to a rollback timer expiry. If the operations of the primary site and the secondary site are not coordinated, both copies can potentially get consensus and result in a split-brain.

The present design selects one of the storage sites each having a storage cluster, as an authority and implements a state machine to track a failover state and advance the failover workflow. This authority will be local for one cluster and remote for the other cluster. The new authority being a single source of truth, provides consistency and correctness using atomic test and set semantics. Completion of an atomic test operation is a pre-requisite for a subsequent set operation. If a secondary site having a slave role is chosen as authority, it is possible that the primary site having a master role may not be able to perform rollback if the inter cluster network link goes down. This could negatively impact a service level agreement of planned failover and could result in disruption of I/O operations. Hence, the storage site having a current master role is chosen to be the authority to hold the state information.

The planned failover (PFO) process defines a role change operation (e.g., cutover operation, point of no return operation) during a PFO process. Any failure before the role change operation requires the primary cluster with a master role and primary copy of data to continue to serve I/O operations and prevents a secondary cluster with a slave role and mirror copy of the data from acquiring a consensus. If a failure occurs after the role change operation, then the secondary cluster will serve I/O operations and the primary cluster with the original master role loses the privilege to perform a rollback.

A primary storage cluster chosen as an authority to grant consensus will maintain a failover state machine in a configuration database (e.g., 512a, 512b) with the following states for a given CG as indicated below in table 1.

| STATE | MASTER | CONTEXT | RELATIONSHIP STATE |
| --- | --- | --- | --- |
| State 0 | Primary cluster | — | In Sync |
| State 1 | Primary cluster | Failover | In Sync |
| State 2 | Secondary cluster | — | Out of sync (OOS) |
| State 3 | Primary cluster | — | OOS |

For state 0, the primary storage cluster has a master role, the secondary storage cluster has a slave role, and the primary and secondary storage clusters have a relationship state of In Sync. In this example, a primary copy of data that is stored in the primary storage cluster can be synchronously replicated as a secondary copy of the data that is stored in the secondary storage cluster. For state 1, a failover operation is initiated with a failover start command and the relationship state for the primary and secondary storage clusters remains as In Sync. A failover operation context is able to uniquely identify requests for a particular planned failover instance. The failover state machine transitions from state 1 to state 2 if a role change operation (e.g., role change event) occurs at state 1 with the secondary storage cluster switching from the slave role to the master role and the relationship state being out of sync (OOS) for state 2. The state machine transitions from state 1 to state 3 if a rollback event occurs at the primary storage cluster due to expiration of a rollback timer prior to a role change operation. The relationship state is OOS for state 3 and the primary storage cluster remains as the master role.

Although the operations in the computer-implemented method 600 are shown in a particular order, the order of the actions can be modified. Thus, the illustrated embodiments can be performed in a different order, and some operations may be performed in parallel. Some of the operations listed in FIG. 6 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 600 may be executed by a storage controller, a storage virtual machine (e.g., SVM 511a, SVM 511b), a multi-site distributed storage system, a computer system, a machine, a server, a web appliance, a centralized system, a storage node (e.g., 136a-n, 146a-n, 236a-n, 246a-n, 311, 312, 321, 322, 400), or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes a primary storage cluster having a primary copy of data in a consistency group (CG1). The consistency group of the primary storage cluster is initially assigned a master role. A secondary storage cluster has a mirror copy of the data of the primary copy in the consistency group. The consistency group of the secondary storage cluster (CG2) is initially assigned a slave role.

At operation 610, a multi-site distributed storage system having the primary and secondary storage clusters receives a failover start command and this initializes or sets a failover operational context in the state machine of the primary storage cluster, which is chosen to be an authority to grant consensus and maintain failover states in the state machine. The failover operational context indicates that the planned failover is in progress. The existence of this failover operational context is needed for the secondary storage cluster to perform a role change operation. The failover state machine is implemented in a configuration database (e.g., persistent replicated database (RDB) 512a, 512b), which is available on all storage nodes of a storage cluster. In this example, the failover state machine is implemented in a configuration database of the primary storage site.

At operation 612, prechecks are performed by the multi-site distributed storage system to determine whether the planned failover is incompatible with other operations. For example, a move operation for a volume would need to be allowed to complete before the planned failover proceeds. At operation 613, the multi-site distributed storage system (e.g., primary storage cluster, secondary storage cluster) raises a fence (e.g., a filesystem persistent fence) to temporarily prevent new I/O operations from entering the multi-site distributed storage system. Once activated the fence is persistent and therefore handles any failures including a controller reboot for a cluster.

At operation 614, the multi-site distributed storage system (e.g., primary storage cluster) starts a rollback timer to potentially pre-empt a long-running, delayed, or failed planned failover process and thereby guarantee non-disruptiveness of the distributed storage system. Expiration of this timer causes the fence to drop and allow I/O operations locally on the primary storage cluster. This rollback timer provides non-disruptiveness from the consistency group of the primary storage cluster before a role change operation (e.g., role change operation 624). Any failure that results in failing the planned failover operation, such as network connectivity issues or slowness leading to timeout issues, will prevent the role change operation. In that case, the rollback timer at the consistency group of the primary cluster (CG1) will pre-empt the role change operation and allow I/O operations locally at CG1 thereby guaranteeing non-disruptiveness. This timer also enables making planned failover operation a time-bound operation by the way of setting the timer to a user defined value. If the steps leading to the role change operation take longer than the timeout, I/O commands will resume based on the timer expiry.

At operation 616, the computer-implemented method includes rejecting I/O operations due to the fence. At operation 618, the computer-implemented method includes draining inflight operations at the primary storage cluster to ensure that both primary and mirror copies of CG1 and CG2 have consistent data. In other words, inflight operations will be sent to each of the primary storage cluster and the secondary storage cluster to ensure that both copies of the data are consistent with respect to the data. Operation 618 is important for achieving non-disruptiveness from the primary storage cluster before the role change operation. At operation 620, volumes of nodes of the secondary storage cluster are changed from a read only state to a readable and writeable state. At operation 622, the computer-implemented method converts a local attribute of the secondary storage cluster from a slave role to a master role and at operation 623 attempts to update a role change status to the state machine of the primary storage cluster with a remote call.

At operation 624, the computer-implemented method includes performing, with the primary storage cluster, a role change operation to change a role for CG2 using an atomic test and set procedure. The atomic test involves determining whether a failover context still exists or not for a current failover state of the state machine at operation 626. At operation 628, the setting to change owner of CG2 from slave role to master role only occurs when atomic test determines that the failover context exists. In this case, at operation 629, the fence is removed from the secondary storage cluster to allow local I/O access to the secondary storage cluster, a local attribute of the primary cluster is converted from the master role to the slave role, and the volumes of CG1 of the primary storage cluster are changed from readable and writeable state to read only. At operation 630, the computer-implemented method includes clearing the state machine to remove the planned failover context for a given CG. At operation 632, the computer-implemented method includes establishing synchronous replication in a reverse direction from the secondary storage cluster to the primary storage cluster.

If the atomic test fails with no failover context at operation 626 and thus a planned failover fails, then no change occurs in owner of the consistency group (e.g., CG2 remains in slave role) at operation 634.

The planned failure feature provides non-disruptiveness guarantee and avoidance of split-brain without using a mediator for different failure examples. A first failure example is a controller failure at the primary storage cluster after operation 614 and before a role change operation 624 completes. The primary storage cluster will have the original master role, and upon a storage mount operation will obtain a consensus because the primary storage cluster is still the master cluster and this also clears the failover operation context at this time.

A second failure example includes a rollback timer expiring and then an atomic test and set procedure will be performed on the state information record of the state machine. Upon a successful rollback for the primary cluster, the failover process will drop the fence and allow I/O locally on the primary cluster. The atomic test and set semantics are implemented in a configuration database by using configuration transactions (e.g., RDB transactions). The atomic test determines if the failover state indicates that the role change operation has not been performed and set can occur to erase the failover context to prevent any subsequent attempt of a role change operation for the secondary storage cluster. For this failure example, the order of the operations will obtain a configuration transaction record (e.g., an RDB transaction) and lock this record, determine if the primary storage cluster still has the master role, erase the failure context if the primary cluster is still the master, and then commit the configuration transaction record (e.g., RDB transaction) and unlock the record.

A third failure example includes a replication failure between the primary and secondary clusters due to network connectivity issues. This leads to clearing of the failover context, thereby preventing performance of the role change operation.

A fourth failure example includes both of the primary and secondary storage clusters experiencing a reboot after operation 620 and before operation 624. Thus, leading to a two master situation for the primary and secondary clusters. In this case, both clusters will try to obtain the consensus to serve I/O operations as part of a reboot. Since the role change operation has not happened, the primary storage cluster is still the master and will obtain the consensus and serve I/O operations.

A fifth failure example includes both clusters having a reboot after role change operation 624 but before operation 629 leading to another two master situation. Again both clusters will attempt to obtain consensus but since the role change operation has already taken place, the primary storage cluster will not be able to obtain the consensus, instead the consensus will be granted to the secondary storage cluster by preventing a subsequent role change operation for the planned failover running in the secondary cluster.

Figure 7:
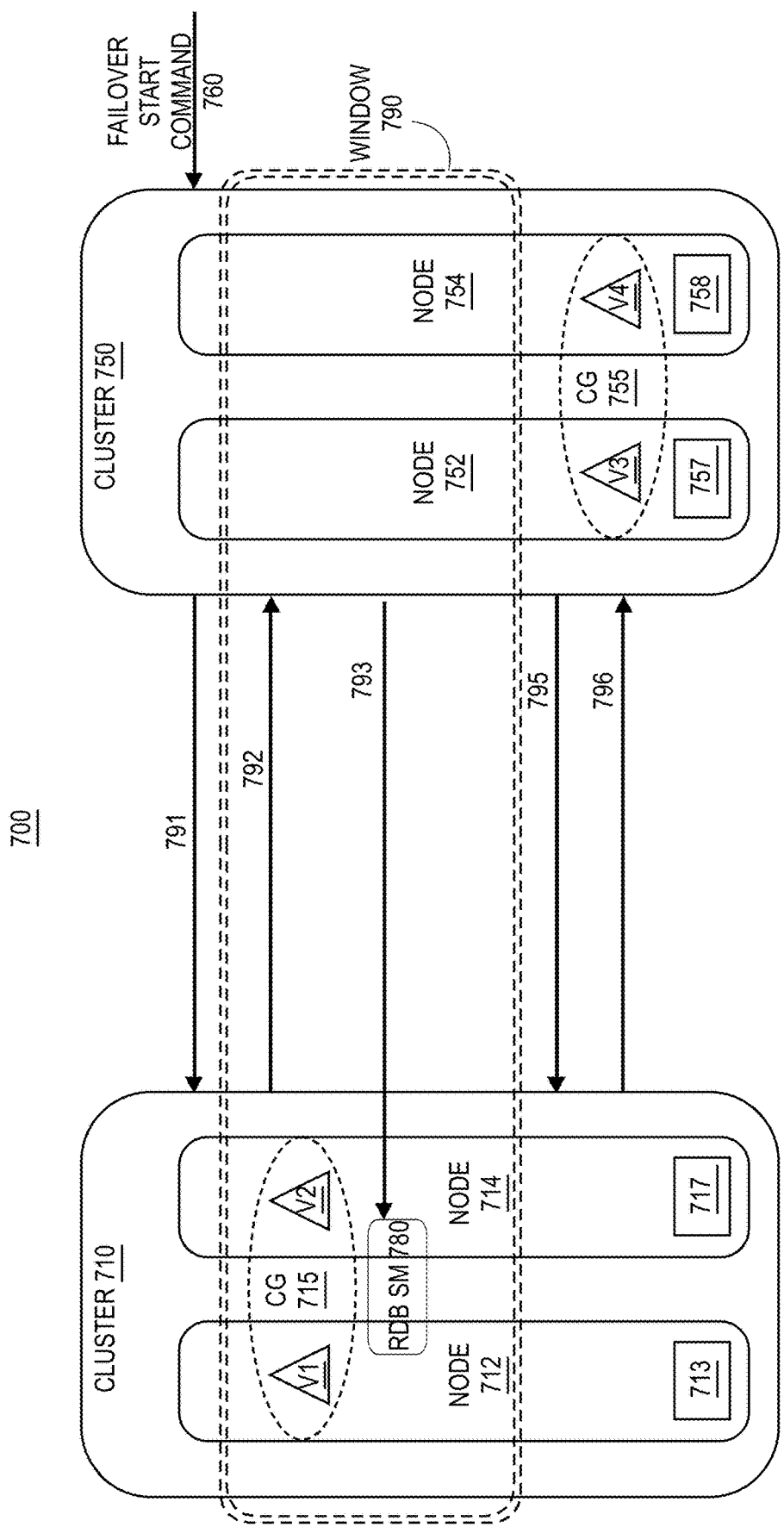
FIG. 7 is a block diagram of a multi-site distributed storage system 700 that performs a planned failover feature without using an external mediator in accordance with an embodiment of the present disclosure.

FIG. 7 is a block diagram of a multi-site distributed storage system 700 that performs a planned failover feature without using an external mediator in accordance with an embodiment of the present disclosure. As noted above, this planned failover feature of the present design provides an order of operations such that a primary copy of data at a primary storage cluster 710 continues to serve I/O operations until a mirror copy of the data at a secondary storage cluster 750 is ready. This planned failover feature provides non-disruptiveness during planned failover from a primary copy of data to a second copy of the data without using an external mediator—in presence of various failures.

In one embodiment, the distributed storage system 700 includes the primary storage cluster 710 with a primary copy of data in a consistency group (CG) 715. A consistency group may include a subset or all volumes or data containers of a storage node. The consistency group 715 includes volume V1 of node 712 and volume V2 of node 714. Initially, CG 715 can be assigned a master role. The secondary storage cluster 750 has a mirror copy of the data in the consistency group 755. The consistency group 755 may include a volume V3 of node 752 and volume V4 of node 754. CG 755 can be initially assigned a slave role prior to a planned failover.

The distributed storage system 700 having the primary and second clusters receives a planned failover start command 760 and this initializes or sets a failover operational context in a state machine of a replicated database (RDB) 780 of the primary storage cluster 710. The failover state machine is implemented in a configuration database (e.g., persistent replicated database (RDB) 780, RDB 512a, RDB 512b, configuration database 238, 248, 338, 348), which is available on all storage nodes of a storage cluster. The failover operational context indicates that the planned failover is in progress. The planned failover may be implemented to provide non-disruptive operations even in the presence of failures including but not limited to network disconnection between storage clusters and an optional mediator, and even if an entire data center becomes non-functional. Next, prechecks are performed by the secondary storage cluster 750 to determine whether a planned failover is incompatible with other operations. If so, incompatible operations are completed prior to proceeding with the planned failover. Then, a communication 791 is sent to the primary storage cluster 710. In response, the primary storage cluster 710 raises a fence and starts a rollback timer. Expiration of this timer causes the fence to drop and allow I/O operations locally at the primary storage cluster 710. This rollback timer provides non-disruptiveness from the consistency group 715 before a role change operation (e.g., role change operation 624) occurs.

Any failure that results in failing the planned failover operation, such as a network connectivity issues or slowness leading to timeout issues, will prevent the role change operation. In that case, the rollback timer at the consistency group 715 will pre-empt the role change operation and allow I/O operations locally at CG 715 thereby guaranteeing non-disruptiveness. This timer also enables making planned failover operation a time-bound operation by the way of setting the timer to a user defined value. If the operations leading to the role change operation take longer than the timeout, I/O commands will resume based on the timer expiry.

Next, the primary storage cluster 710 rejects I/O operations and drains inflight operations to ensure that both primary and mirror copies of CG 715 and CG 755 have consistent matching content of data. A communication 792 is then sent from primary storage cluster 710 to secondary storage cluster 750 and this causes volumes V3 and V4 of CG 755 to change from an initial read only state to a readable and writeable state.

The secondary storage cluster sets a persistent fence to prevent new I/O operations from being processed by the secondary storage cluster 750 until a role change operation (e.g., operation 624, point of no return operation) occurs. A filesystem persistent fence is used to implement this persistent fence. Once activated, the fence is persistent and therefore handles any failures including a controller reboot for a controller of a cluster or data center. Also, the secondary storage cluster 750 converts CG 755 from a slave role to a master role for a local attribute. CG 755 can notify a proxy module of a change to handle I/O operations locally at CG 755, and perform a role change operation (e.g., operation 624) with an atomic test and set procedure as described for operation 624. As part of this operation, the secondary storage cluster attempts to update a role change status for the state machine of the primary storage cluster with a communication 793 (e.g., remote call 793). The primary storage cluster is the state authority and will update the state machine of the configuration database 780 with the role change operation if a failover context still exists in the state machine. The fence for the secondary storage cluster 750 can be bypassed and this allows I/O operations to be handled by the secondary storage cluster 750.

A communication 795 is sent to CG 715 and this causes a master role to change to a slave role for CG 715. CG 715 can notify a proxy module of a change from I/O operations being locally processed at CG 715 and instead forwarding the I/O operations to CG 755 for processing. Each node (e.g., 712, 714, 752, 754) includes a proxy module (e.g., 713, 717, 757, 758) for these notifications. A communication 796 is sent to CG 755 and then volumes of CG 755 are resynchronized in a reverse direction (e.g., CG 755 to CG 715) to volumes of CG 715.

The multi-site distributed storage system can notify a host of paths to CG 755 as being active and optimized and this will enable the host to start sending I/O operations to the mirrored copy of CG 755.

A timing window 790 includes the reject I/O operations, drain inflight operations, set volumes in CG 755 to read write, set persistent fence for CG 755, set CG 755 from slave to master role, send notifications for proxy modules, perform role change for CG 755, and set a bypass of fence for CG 755. The persistent fence is used to avoid serving I/O operations during the timing window 790 when both primary data storage (e.g., 715) and secondary data storage (e.g., CG 755) are attempting to have a master role to serve I/O operations and this avoids a split-brain situation.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
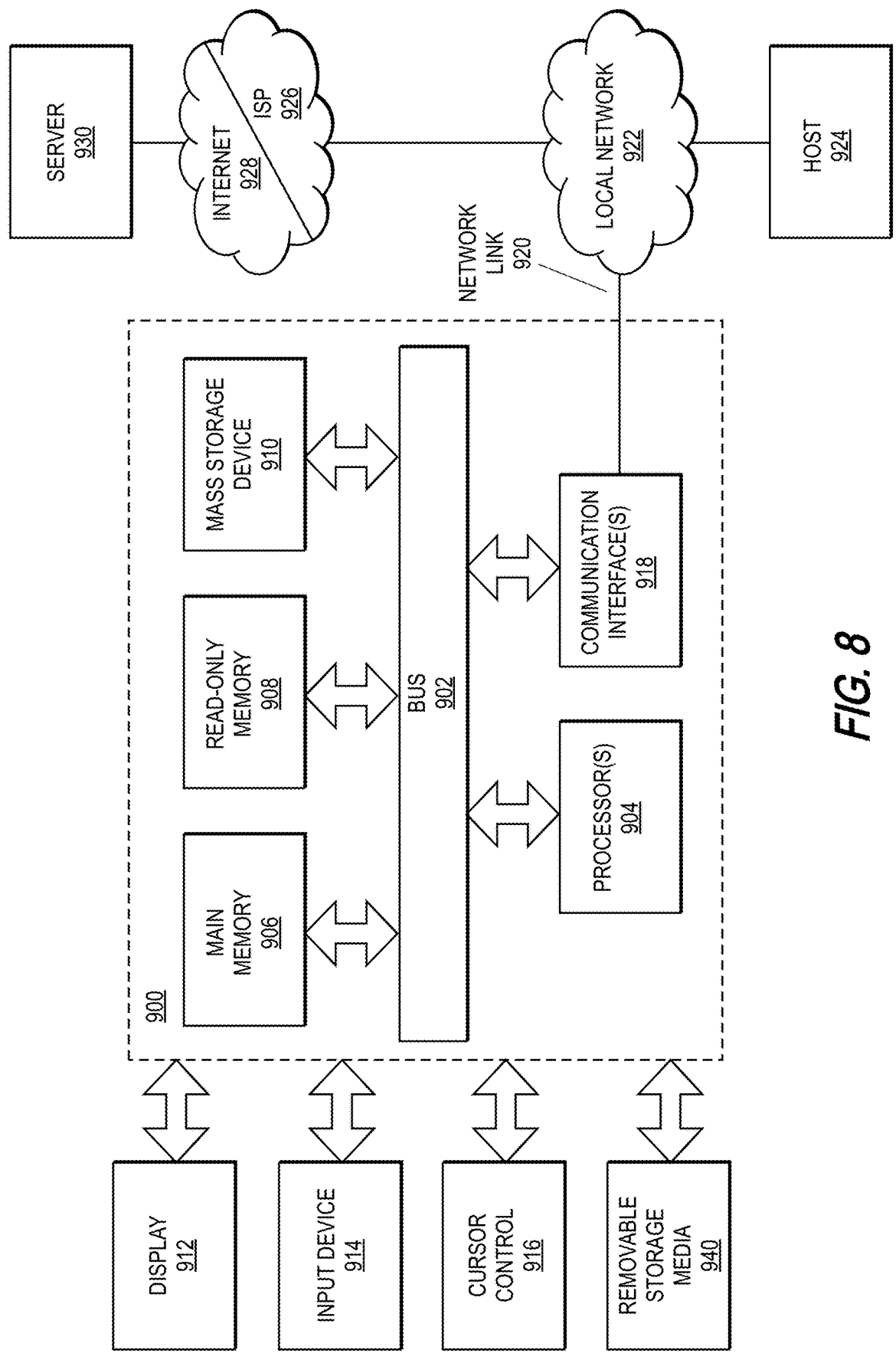
FIG. 8 illustrates an example computer system in which or with which embodiments of the present disclosure may be utilized.

FIG. 8 is a block diagram that illustrates a computer system 900 in which or with which an embodiment of the present disclosure may be implemented. Computer system 900 may be representative of all or a portion of the computing resources associated with a storage node (e.g., storage node 136a-n, storage node 146a-n, storage node 236a-n, storage node 246a-n, nodes 311-312, nodes 321-322, storage node 400, nodes 712, 714, 752, 754), an optional mediator (e.g., mediator 120, mediator 220, mediator 360), or an administrative work station (e.g., computer system 110, computer system 210). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., processing logic, hardware processor(s) 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:

1. A computer-implemented method for a non-disruptive planned failover performed by one or more processors of a distributed storage system, the method comprising:
    initializing a starting state of a planned failover (PFO) between a primary storage cluster and a secondary storage cluster by selecting the primary storage cluster as an authority to hold state information of a state machine based on the primary storage cluster having a master role for serving input/output operations without using an external mediator for controlling operation of the planned failover;
    implementing the state machine with a persistent configuration database of the primary storage cluster to track different states of the planned failover and to indicate a failover context to indicate whether the planned failover is in progress; and
    providing the planned failover with the primary storage cluster having a primary copy of data and the secondary storage cluster having a mirrored copy of the data based on the primary storage cluster being the authority to provide a single source of truth to provide data consistency and correctness between the primary storage cluster and the secondary storage cluster.

2. The computer-implemented method of claim 1, wherein the primary storage cluster has the primary copy of the data in a consistency group that is initially assigned a master role, wherein the secondary storage cluster has the mirrored copy of the data in the consistency group that is initially assigned a slave role.

3. The computer-implemented method of claim 1, wherein the primary storage cluster is selected as the authority based on the primary storage cluster initially being assigned the master role.

4. The computer-implemented method of claim 1, further comprising:
    in response to initializing a starting state of the planned failover (PFO), starting with the primary storage cluster a rollback timer to provide non-disruptiveness for a consistency group before a role change operation is performed.

5. The computer-implemented method of claim 1, further comprising:
    performing a role change operation to change a slave role to a master role for the secondary storage cluster, wherein expiration of a rollback timer prior to the role change operation causes pre-emption of the role change operation and allows input/output (I/O) operations to continue being served locally by the primary storage cluster, wherein expiration of the rollback timer after the role change operation causes the I/O operations to be processed by the secondary storage cluster.

6. The computer-implemented method of claim 1, wherein the primary storage cluster is selected as the authority to grant a consensus to the primary storage cluster or the secondary storage cluster using an atomic test and set procedure that is implemented using a transaction of the persistent configuration database, wherein the atomic test and set procedure comprises determining if a failover context exists and setting a role change for the secondary storage cluster if the failure context exists during the test.

7. The computer-implemented method of claim 1, further comprising setting a persistent fence to temporarily prevent new input/output (I/O) operations from being processed by the multi-site distributed storage system to avoid processing the I/O operations during a timing window when both the primary storage cluster and the secondary storage cluster are attempting to have a master role to serve I/O operations and this avoids a split-brain situation.

8. The computer-implemented method of claim 1, further comprising:

converting a local attribute of the secondary storage cluster from a slave role to a master role;

sending a communication from the secondary storage cluster to the primary storage cluster to update a role change status; and obtaining a new consensus for a consistency group of the secondary storage cluster if a role change operation is performed based on the planned failover state of the state machine.

9. A storage system comprising:

a processing resource; and a non-transitory computer-readable medium coupled to the processing resource, having stored therein instructions, which when executed by the processing resource cause the processing resource to:

initialize a starting state of a planned failover (PFO) between a primary storage cluster and a secondary storage cluster by selecting the primary storage cluster initially having a master role as an authority to hold state information of a state machine based on the primary storage cluster having a master role for serving input/output operations without using an external mediator for controlling operation of the planned failover; and perform a role change operation with an atomic test and set procedure on a state information record of the state machine to change a slave role to a master role for the secondary storage cluster when the atomic test determines that a failover context exists for a planned failover state of the state machine.

10. The multi-site distributed storage system of claim 9, wherein the primary storage cluster has a primary copy of data in a consistency group that is initially assigned a master role, wherein the secondary storage cluster has a mirrored copy of the data in the consistency group that is initially assigned a slave role.

11. The multi-site distributed storage system of claim 9, wherein the primary storage cluster is selected as the authority based on the primary storage cluster initially being assigned the master role, wherein the planned failover is performed with no external mediator or an unavailable mediator.

12. The multi-site distributed storage system of claim 9, wherein the instructions when executed by the processing resource cause the processing resource to implement a state machine with a persistent configuration database of the primary storage cluster to track different states of the planned failover to indicate a master role or slave role for the primary storage cluster and a secondary storage cluster, and to indicate a failover context to indicate whether the planned failover is in progress.

13. The multi-site distributed storage system of claim 9, wherein the instructions when executed by the processing resource cause the processing resource to start a rollback timer, to perform the atomic test and set procedure on a state information record of a state machine including a test of determining if the planned failover state indicates that the role change operation has not occurred and a set that includes erasing a failover context in the state machine if the planned failover state indicates that the role change operation has not occurred.

14. The multi-site distributed storage system of claim 9, wherein expiration of a rollback timer prior to the role change operation causes pre-emption of the role change operation and allows input/output (I/O) operations to continue being served locally by the primary storage cluster, wherein expiration of the rollback timer after the role change operation causes the I/O operations to be processed by the secondary storage cluster.

15. The multi-site distributed storage system of claim 9, wherein the primary storage cluster is selected as the authority to grant a consensus to the primary storage cluster or the secondary storage cluster.

16. The multi-site distributed storage system of claim 9, wherein a replication failure due to a network connectivity disruption between the primary storage cluster and the secondary storage cluster causes a failure context to be erased for a planned failover state to prevent the role change operation from being performed.

17. A non-transitory computer-readable storage medium embodying a set of instructions, which when executed by a processing resource of a multi-site distributed storage system cause the processing resource to:

initialize a starting state of a planned failover (PFO) between a primary storage cluster and a secondary storage cluster by selecting a primary storage cluster as an authority to hold state information of a state machine based on the primary storage cluster having a master role for serving input/output operations without using an external mediator for controlling operation of the planned failover;

determining whether a failover context exists for a planned failover state by using an atomic test and set procedure on a state information record of the state machine to potentially change a slave role to a master role for the secondary storage cluster; and failing the planned failover when the atomic test determines that no failover context exists for the planned failover state of the state machine.

18. The non-transitory computer-readable storage medium of claim 17, wherein the primary storage cluster has the primary copy of the data in a consistency group that is initially assigned a master role, wherein the secondary storage cluster has the mirrored copy of the data in the consistency group that is initially assigned a slave role.

19. The non-transitory computer-readable storage medium of claim 17, wherein the primary storage cluster is selected as the authority based on the primary storage cluster initially being assigned the master role, wherein the planned failover is performed without using an external mediator.

20. The non-transitory computer-readable storage medium of claim 17, wherein the authority to determine a consensus using a transaction of the persistent configuration database.

* * * * *